United States Patent
Nichols et al.

(10) Patent No.: US 10,432,825 B2
(45) Date of Patent: Oct. 1, 2019

(54) COLOR MAP FROM COLOR DATA COLLECTED FROM PLURALITY OF SOURCES

(71) Applicant: Hewlett-Packard Development Company, L.P., Houston, TX (US)

(72) Inventors: Stephen J Nichols, Vancouver, WA (US); Jay S Gondek, Camas, WA (US); Jefferson P Ward, Brush Praire, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/504,048

(22) PCT Filed: Aug. 19, 2014

(86) PCT No.: PCT/US2014/051711
§ 371 (c)(1),
(2) Date: Feb. 15, 2017

(87) PCT Pub. No.: WO2016/028282
PCT Pub. Date: Feb. 25, 2016

(65) Prior Publication Data
US 2017/0280025 A1    Sep. 28, 2017

(51) Int. Cl.
*H04N 1/60*    (2006.01)

(52) U.S. Cl.
CPC ......... *H04N 1/6058* (2013.01); *H04N 1/6008* (2013.01); *H04N 1/6033* (2013.01); *H04N 1/6091* (2013.01); *H04N 1/6097* (2013.01); *H04N 2201/0082* (2013.01)

(58) Field of Classification Search
CPC .. H04N 1/6058; H04N 1/6008; H04N 1/6033; H04N 1/6091; H04N 1/6097; H04N 2201/0082
USPC ................................ 358/1.9, 1.15, 518, 448
See application file for complete search history.

(56) References Cited

U.S. PATENT DOCUMENTS

| | | | |
|---|---|---|---|
| 6,546,132 B1 | 4/2003 | Bhattacharjya et al. | |
| 8,085,435 B2 | 12/2011 | Hauf et al. | |
| 8,194,298 B2 | 6/2012 | Thomas | |
| 8,593,692 B2 | 11/2013 | Chen et al. | |
| 2007/0097390 A1* | 5/2007 | Huang | H04N 1/603 358/1.9 |

(Continued)

FOREIGN PATENT DOCUMENTS

| | | |
|---|---|---|
| JP | 2003154645 | 5/2003 |
| JP | 2003191532 | 7/2003 |
| KR | 20060056727 | 5/2006 |

OTHER PUBLICATIONS

Emmel, P. et al., Colour Calibration for Colour Reproduction, (Research Paper), May 28-31, 2000. 4 pages, found at http://infoscience.epfl.ch/record/99850/files/ccfcr.pdf.

*Primary Examiner* — Quang N Vo
(74) *Attorney, Agent, or Firm* — HP Inc. Patent Department

(57) ABSTRACT

Color data may be collected from a plurality of sources. A plurality of color map selection fields may be indexed at a table to a plurality of color maps. The plurality of color maps may be based on the collected color data. Each entry of the table may include an identifier to match one of the plurality of color maps to at least one permutation of the color map selection fields.

15 Claims, 4 Drawing Sheets

(56) References Cited

U.S. PATENT DOCUMENTS

2007/0132800 A1* 6/2007 Huang ................ B41J 2/17546
                                                347/19
2008/0043265 A1    2/2008 Kim et al.
2009/0190194 A1    7/2009 Deer et al.
2010/0321401 A1* 12/2010 Engelbert ................ G09G 5/06
                                                345/605

* cited by examiner

COLOR MAP FROM COLOR DATA COLLECTED FROM PLURALITY OF SOURCES

BACKGROUND

Output devices such as printers may implement a subtractive color model, like a cyan, magenta, yellow, and black (CYMK) color model, while input devices such as computer monitors, mobile phones, and other input devices may implement an additive color model, like an red, green and blue (RGB) color model.

To output data from an input device, such as a graphic, text or a combination thereof, output devices may convert the additive color model into a subtractive color model via a print color transform. Manufacturers and/or vendors are challenged to provide print color transform such that graphics and/or text are outputted from output devices, like a printer, with more accurate color representation.

BRIEF DESCRIPTION OF THE DRAWINGS

The following detailed description references the drawings, wherein.

DETAILED DESCRIPTION

Figure 1:
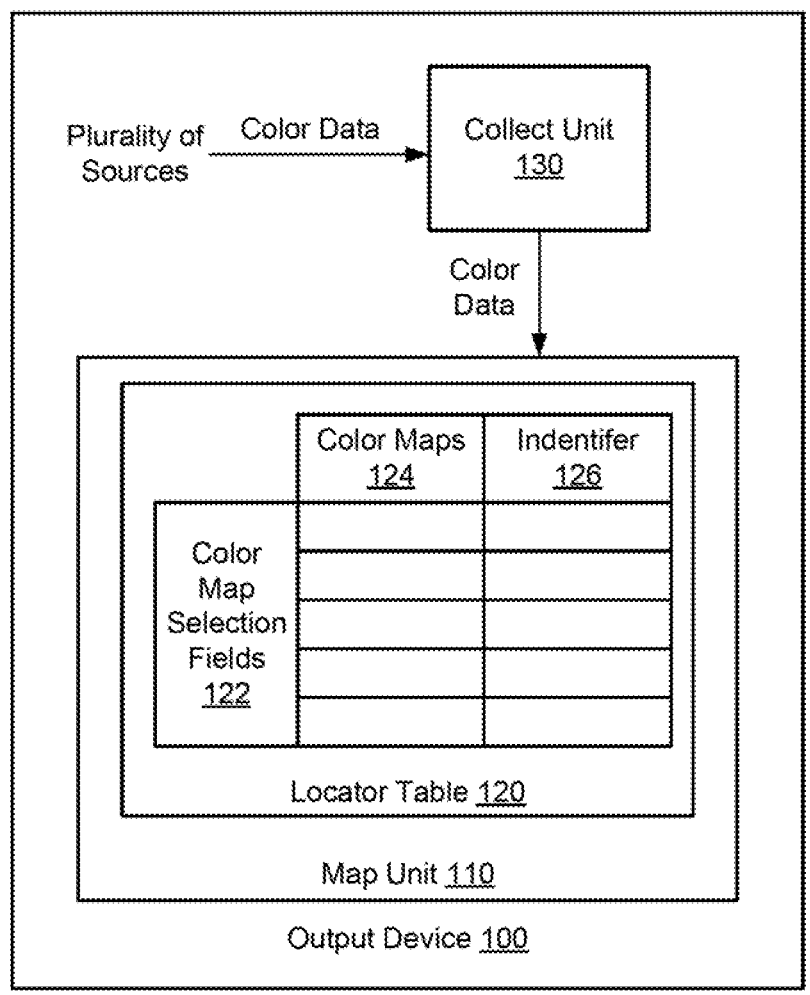
FIG. 1 is an example block diagram of an output device to collect color data from a plurality of sources for a color map.

Specific details are given in the following description to provide a thorough understanding of embodiments. However, it will be understood that embodiments may be practiced without these specific details. For example, systems may be shown in block diagrams in order not to obscure embodiments in unnecessary detail. In other instances, well-known processes, structures and techniques may be shown without unnecessary detail in order to avoid obscuring embodiments.

Print color transforms may be dependent on a particular ink or toner formulation. Therefore, it may be desirable to provide color maps along with the printer inks or toners, rather than include them in printer firmware or a printer driver. However, compared to storing color maps in printer firmware, the management of color data in printer supplies may be more complicated. For instance, a customer may have installed a mix of supply versions in the printer, and different supplies may have changes in inks and color maps and may support different media. In addition, those supplies may be used by multiple printers, or be used in printers that have not yet been developed.

In the case where colorant-specific color transforms are stored on printer cartridges, the printer must read data from the print supplies to create a set of usable color transforms. However, specific print conditions may not match the data contained in the print cartridge. For example, a new printer may be developed that uses older supplies. In addition, printer-specific, ink-independent aspects of color reproduction may be more appropriately stored on the printer than in an ink cartridge. Printer-specific, color-related parameters may include, for example, the use of chemical fixatives (ink fixer), a heater/dryer, print-mode variations, media type, page density, humidity, temperature, or duplex printing.

Examples may include an architecture where the printer may contain color corrections and/or modifications, which are used in conjunction with data from the printer cartridge to formulate printer-specific color transforms. For example, in one embodiment, an output device may include a collect unit and a map unit. The collect unit may collect color data from a plurality of sources. Example sources may include a printer cartridge, a peripheral device, a source local to the output device and a remote source accessed over a network. The map unit may store a locator table. The locator table may index a plurality of color map selection fields to a plurality of color maps. The plurality of color maps may be based on the collected color data. Each entry of the locator table may include an identifier to match one of the plurality of color maps to at least one permutation of the color map selection fields.

Thus, examples may provide flexibility to manage, version, update, and/or re-use color resources that may be stored in the printer, in the print cartridge, and/or read from an external memory or network connection. This may allow for changes in inks, media support, color maps, and/or printers. In one example, the printer may modify or override data that may have come from the supplies, and vice verse.

For instance, examples may offer improved ink/toner types to customers that didn't exist at a time the original product was manufactured. Also, examples may be able to correct color maps in printers in the field for errors discovered after the start of manufacturing. Further, examples may correct color maps due to changes in media and add support for media types that didn't exist at the time the product was manufactured.

Moreover, examples may introduce inks/toners with different color characteristics as well as introduce different improved color maps for a single color, without requiring the customer to replace all ink/toner supplies to correct for errors. Examples may further support customized color maps for large customers that may have special color rendering needs (such as logo colors) and differentiate color maps on trade vs. ink subscription printer cartridges.

Referring now to the drawings, FIG. 1 is an example block diagram of an output device 100 to collect color data from a plurality of sources for a color map 124. The output device 100 may be any type of device capable of receiving and/or combining color data, such as a printer, fax machine, mobile device, computer, and the like. The term color data may refer to any type of data used to modify and/or generate a color map.

In FIG. 1, the output device 100 is shown to include a map unit 110 and a collect unit 130. The map and collect units 110 and 130 may include, for example, a hardware device including electronic circuitry for implementing the functionality described below, such as control logic and/or memory. In addition or as an alternative, the map and collect units 110 and 130 may be implemented as any combination of hardware and programming to implement the functionalities of the units. For example, the hardware may be a processor and the programming may be a series of instructions or microcode encoded on a machine-readable storage medium and executable by a processor.

The collect unit 130 may collect the color data from a plurality of sources. Example sources may include a printer cartridge, a peripheral device, a source local to the output device and a remote source accessed over a network. For instance, the local source may be included in the output device 100. In one example, the collect unit 130 may collect the color data from the printer cartridge.

The map unit 110 may store a locator table 120, such as at a memory of the map unit 110. The locator table 120 may index a plurality of color map selection fields 122 to a plurality of color maps 124. The plurality of color maps 124 may be based on the collected color data. Each entry of the locator table 120 may include an identifier 128 to match one of the plurality of color maps 124 to at least one permutation of the color map selection fields 122. The locator table 120 will be explained in greater detail with respect to FIG. 2.

A number of the permutations of the plurality of color map selection fields 122 may be greater than a number of the plurality of color maps 124. In one example, the locator table 120 may map all permutations of the color map selection fields 122 to at least one of the plurality of color maps 124. While FIG. 1 show a limited number of the colors maps 124, examples of the output device 100 may include more or less color maps 124, such as for different types and/or versions of printers, media, marking materials, users and the like. The marking material may include, for example, printer ink and/or toner.

As explained above, a color map 124 may be used to convert between different color models. For example, before an input image can be printed as a physical output, the input additive color model, such as RGB, may be converted to an output subtractive color model, such as CMYK. This may be done using a color map that that transforms or converts RGB color data into CMYK color data. Examples of RGB color models may include sRGB, Adobe® RGB, scan RGB, and the like. However, examples are not limited to the RGB and CYMK color models, and may include any type of input and/or output color models, such as the Specifications for Web Offset Publications (SWOP) CMYK model and the International Commission on Illumination (CIE) L*a*b* color model.

In one example, the color map 124 may correspond to a particular media type. For example, particular paper types, or particular paper colors may have corresponding color maps 124. For example, one color map 124 may correspond to plain paper and another transform map 124 may correspond to thicker paper, such as company letterhead, or bond paper. In another example, different degrees of output quality may have different color maps 124. For example, a "draft" quality may have one color map 124, and a "best" quality may have a different color map 124. In yet another example, different input devices may have different corresponding color maps 124. For example, different models of printers may have different corresponding color maps 124.

Figure 2:
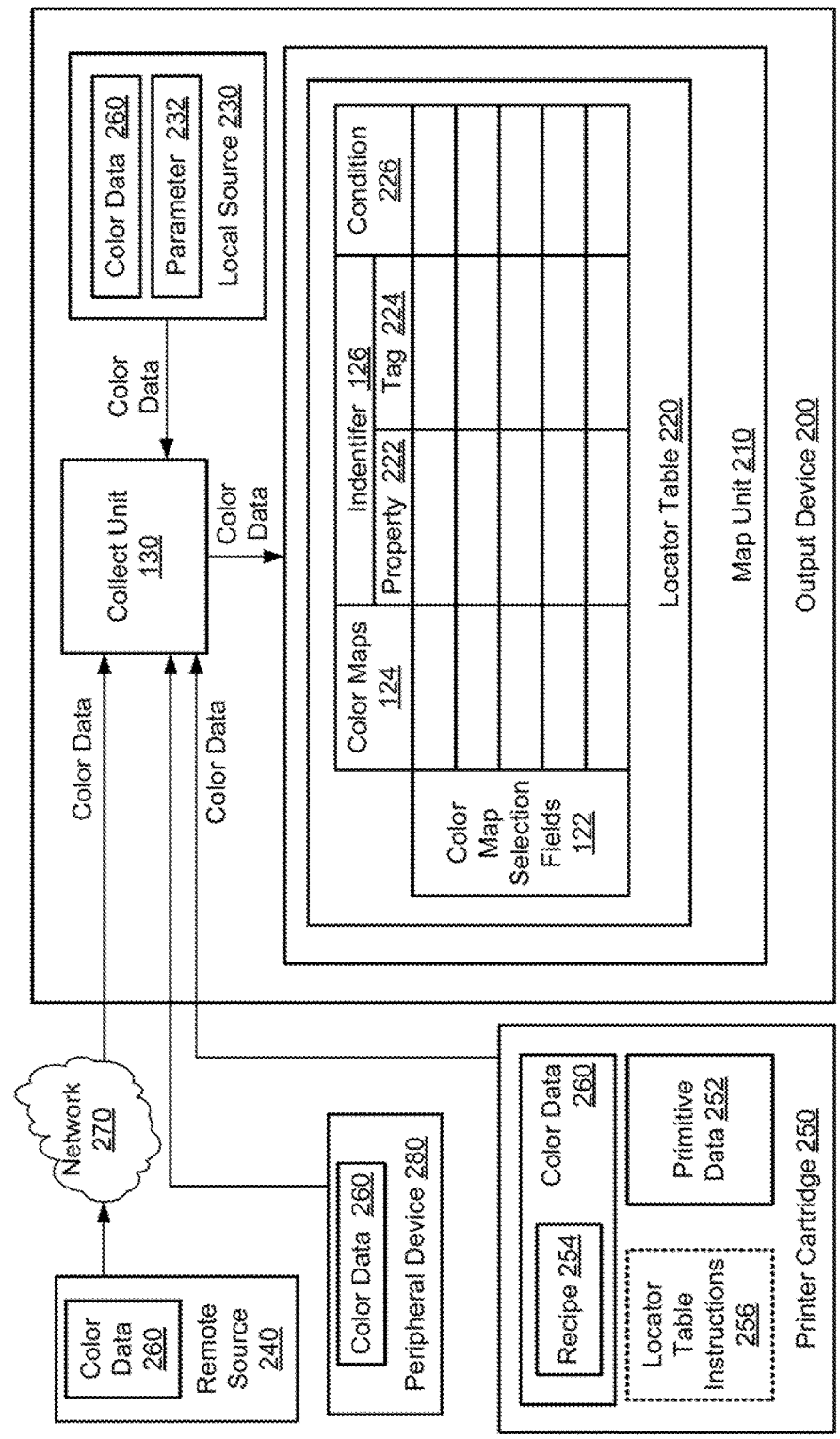
FIG. 2 is another example block diagram of an output device to collect color data from a plurality of sources for a color map.

FIG. 2 is another example block diagram of an output device 200 to collect color data from a plurality of sources for a color map 124. The output device 200 of FIG. 2 may respectively include at least the functionality and/or hardware of the output device 100 of FIG. 1. For instance, the output device 200 is shown to include the collect unit 130 and a map unit 210. The map unit 210 may include at least the functionality and/or hardware of the map unit 110 of FIG. 1, such as a locator table 220. Further, the output device 200 is shown to include a local source 230 and to interface with a remote source 240 over a network 270 as well as a printer cartridge 250 and a peripheral device 280.

As noted above, the collect unit 130 may collect the color data 260 from a plurality of sources, such as the printer cartridge 250, the peripheral device 280, the source local 230 to the output device 200 and the remote source 240 accessed over the network 270. For instance, the local source 230 may be included in the output device 100. The local source 230 may include any type of memory device, such as firmware, Random Access Memory (RAM), an Electrically Erasable Programmable Read-Only Memory (EEPROM), a storage drive, a Compact Disc Read Only Memory (CD-ROM), and the like. The peripheral device 280 may be any type of external storage device, such as a flash drive. Secure Digital (SD) card, portable storage drive, and the like. The remote source 240 may be, for example, a local network, the internet, a cloud service, and the like.

In one example, the collect unit 130 may to collect the color data from the printer cartridge 250. The printer cartridge 250 may be any type of cartridge to store a marking material. Example marking materials may include ink, toner and the like. In one example, the printer cartridge 250 may be an ink cartridge that contains liquid ink for use with an inkjet printer. In another example, the printer cartridge 250 may be a toner cartridge that contains dry toner powder for use with a laser printer. While FIG. 2 shows a single printer cartridge 250, a plurality of the print cartridges 250 may be interfacing with the output device 200. Each of these printer cartridges 250 may correspond to a different color.

The map unit 110 may store the locator table 120. The locator table 120 may index a plurality of color map selection fields 122 to a plurality of color maps 124. The plurality of color maps 124 may be based on the collected color data. Each entry of the locator table 120 may include an identifier 126 to match one of the plurality of color maps 124 to at least one permutation of the color map selection fields 122.

For example, the output device 200 may be a printer having 30 media selections, 3 quality modes, 2 supported color spaces, and two different ink usage settings (normal or light). In this case, there may 360 possible different color-conversion maps. In practice, a much smaller set of color maps 124 may be stored (20, for instance). Thus, those 360 user-selectable color map selection field 122 permutations may be mapped to the 20 available color maps 124. In one example, the locator table 220 may be installed during printer-firmware installation.

The plurality of color map selection fields 122 includes at least one of a type of media, quality mode, color space, marking material usage setting and the like. The identifier 126 may include at least one of a tag 224 and a property 222. The property 222 may describe primitive data 252 at least one of stored and generated by the color map 124. The tag 224 is to identify a type of use for which the color map 124 is compatible. While FIG. 1 shows a single property 222 field and a single tag 224 field, examples may include a plurality of the properties 222 and/or tags 224. For instance, there may be separate tags 224 for the type of media, color space, supply family and the like, that correspond to at least one of the color maps 124.

The property 222 may include a version, marking material channel, and dimension of the color map 124, and the like. The tag 224 may include a color space, media type, print quality, printer platform, supply family and the like. The dimension may include a channel, a count of nodes, and the like. The channel may relate to a type of color. The node may indicate output colorant amount. The marking material usage setting may include a normal setting, a light setting and the like.

The map unit 210 may further select one of the plurality of color maps based on a condition 226 and the identifier 126. At least one of the plurality of color maps 124 may be associated with the condition 226 to restrict when the color map 124 is available for use. For example, the condition 226 may refer to a specific version of print cartridge data. In one example, the map unit 210 may test the condition 226 of the plurality of color maps 124. Then, the map unit 210 may test the tag 224 and the property 222 of the remaining plurality of color maps 124 that satisfy the condition 226.

For example, the tag 224 may not match if the color map selection field 222 specifies plain media and the tag 224 of the specific color map 124 does not specify plain media, but instead specifies a different media, such as photo media. However, examples of the color map 124 may also include multiple tags 224, such as for both plain and photo media. In this case there would be no conflict, since at least one of the tags 224 of the color map 124 would match the color map selection field 222. There may also no conflict if the color map 123 is not associated with a tag 224 or property 222 for the color map selection field 222.

Next, the map unit 210 may select the color map 124 having more restrictions (e.g. more restrictive) for the condition 226, if a plurality of the remaining color maps 124 satisfy the tag 224 and property 222. If a plurality of the remaining color maps 124 also have a same number of restrictions for the condition 226, then the map unit 210 may select the color map 124 having more matches for the tag 224 and property 222. If a plurality of the remaining color maps 124 have a same number of matches for the tag 224 and property 222, then the map unit 210 may select any of the color maps 124.

The map unit 210 may update a color map 124 for a first color if a version of a color map 124 for a second color is changed. The updated color map 124 of the first color may be stored to at least one of the locator table 220 and the printer cartridge 250. The condition 226 may be updated to specify that the updated color map 124 of the first color is to be used with the changed version of the color map 124 for the second color.

Thus, the output device 200, such as a printer, may reconcile the available color data 260 into the correct set of color-transform resources. Therefore, although the intention is for each printer cartridge 250 to hold only its own data, the color data 260 may be split out in various ways and stored in various locations. This allows the output device 200 to modify or override data that may have come from the supplies, and vice versa.

The output device 200 may generate a new color map 124 by at least one of combining the color data 260 from the local source 230 and the printer cartridge 250 and modifying the color data 260 from the printer cartridge 250 with the color data 260 from the local source 230. The local source 230 may include a parameter 232 related to at least one of a use of chemical fixative, a heater, a dryer, a print-mode variation, a media type, a page density, humidity, temperature and duplex printing.

The printer cartridge 250 may include instructions 256 to modify the locator table 220. The locator table 220 may be modified before the plurality of color map selection fields 122 are indexed to the plurality of color maps 124. Also, the locator table 220 may be modified to add a new color map 124 to support an update to at least one of the property 222 and tag 224 included in the printer cartridge 250.

At least some of the color data 260 may include a recipe 254. The recipe 254 may include instructions to build the color map 124 from at least one of an existing map and the primitive data 252. The output device 200 may execute the recipe 254 to build the color map 124. In one example, the recipe 254 may include an operator and an operand. The operator may use the indicator to find at least one of a related color map 124 and the primitive data 252 as the operand to build a new color map 124. By using a general method for the construction of color maps 124, examples may support a wider set of color-map representations, and create color map that reference, load, and modify another map.

In one example, each of the printer cartridges 250 may contain a color map 124. Also, the color map 124 of one of the printer cartridges 100 may be influenced by another of the printer cartridges 100, such as if different versions of the printer cartridges 100 are used together for a single printer. For example, if a new cyan ink is introduced, some changes to the yellow color table may be necessary for green colors.

If an old yellow ink cartridge is in the output device 200 that lacks an updated set of color tables, the necessary color table changes for yellow can be encoded on the cyan cartridge as a newer version along with conditions specifying the yellow ink. Thus, by tagging color resources and specifying conditions, examples may store color maps that handle permutations of new and old ink, and allow those color tables to be updated from a number of sources.

In one example, the property 222 of the color map 124 from the printer cartridge 250 may specify an older version of the output device 200. The property 222 of the color map 124 at the output device 200 may specify a newer version. The recipe 254 of the color map 124 of the newer version may specify to load the color map 124 of the older version and to apply a modifier map to update the color map of the older version.

In another example, the peripheral device 280 may be a data storage device that includes a plurality of colors maps 124 for different types of printers. The output device 200 may collect a color map 124 specific to the output device 200 the via the peripheral device 280, based on testing the condition 226 of the plurality of color maps 124. The recipe 254 of the collected color map 124 may instruct to modify an existing color map 124 of the output device 200, such as for a customer's custom logo.

In yet another example, the recipe 254 of one of the color maps 124 may apply a scalar map to an existing color map 124 at the output device 200 in order to reduce marking material usage in saturated regions of a color space of the existing color map.

Figure 3:
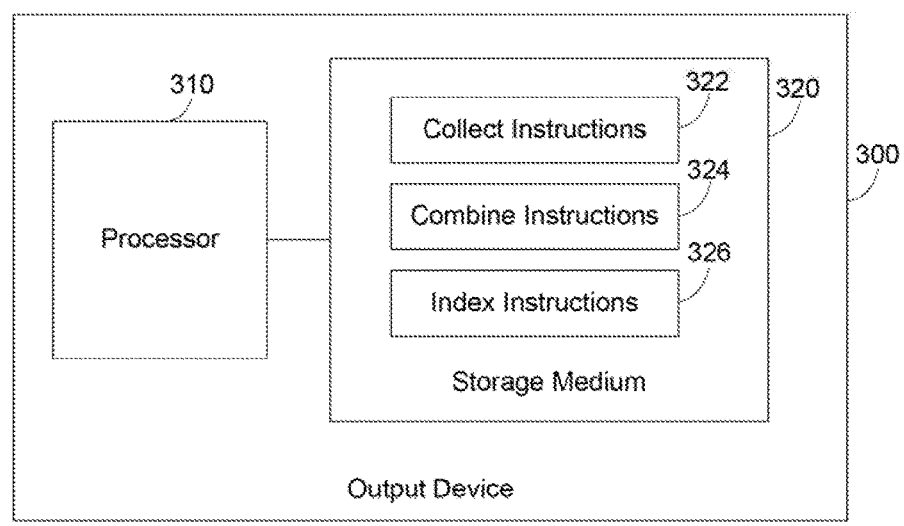
FIG. 3 is an example block diagram of a device including instructions for collecting color data from a plurality of sources for a color map.

FIG. 3 is an example block diagram of a device 300 including instructions for collecting color data from a plurality of sources for a color map. In the embodiment of FIG. 3, the device 300 includes a processor 310 and a machine-readable storage medium 320. The machine-readable storage medium 320 further includes instructions 322, 324 and 326 for collecting color data from a plurality of sources for a color map.

The computing device 300 may be, for example, a printer, a mobile device, a fax machine, multimedia device, a secure microprocessor, a notebook computer, a desktop computer, an all-in-one system, a server, a network device, a controller, a wireless device, or any other type of device capable of executing the instructions 322, 324 and 326. In certain examples, the computing device 300 may include or be connected to additional components such as memories, controllers, etc.

The processor 310 may be, at least one central processing unit (CPU), at least one semiconductor-based microprocessor, at least one graphics processing unit (GPU), a microcontroller, special purpose logic hardware controlled by microcode or other hardware devices suitable for retrieval and execution of instructions stored in the machine-readable storage medium 320, or combinations thereof. The processor 310 may fetch, decode, and execute instructions 322, 324 and 326 to implement collecting color data from the plurality of sources for the color map. As an alternative or in addition to retrieving and executing instructions, the processor 310 may include at least one integrated circuit (IC), other control logic, other electronic circuits, or combinations thereof that include a number of electronic components for performing the functionality of instructions 322, 324 and 326.

The machine-readable storage medium 320 may be any electronic, magnetic, optical, or other physical storage device that contains or stores executable instructions. Thus, the machine-readable storage medium 320 may be, for example. Random Access Memory (RAM), an Electrically Erasable Programmable Read-Only Memory (EEPROM), a storage drive, a Compact Disc Read Only Memory (CD-ROM), and the like. As such, the machine-readable storage medium 320 can be non-transitory. As described in detail below, machine-readable storage medium 320 may be encoded with a series of executable instructions for collecting color data from the plurality of sources for the color map.

Figure 4:
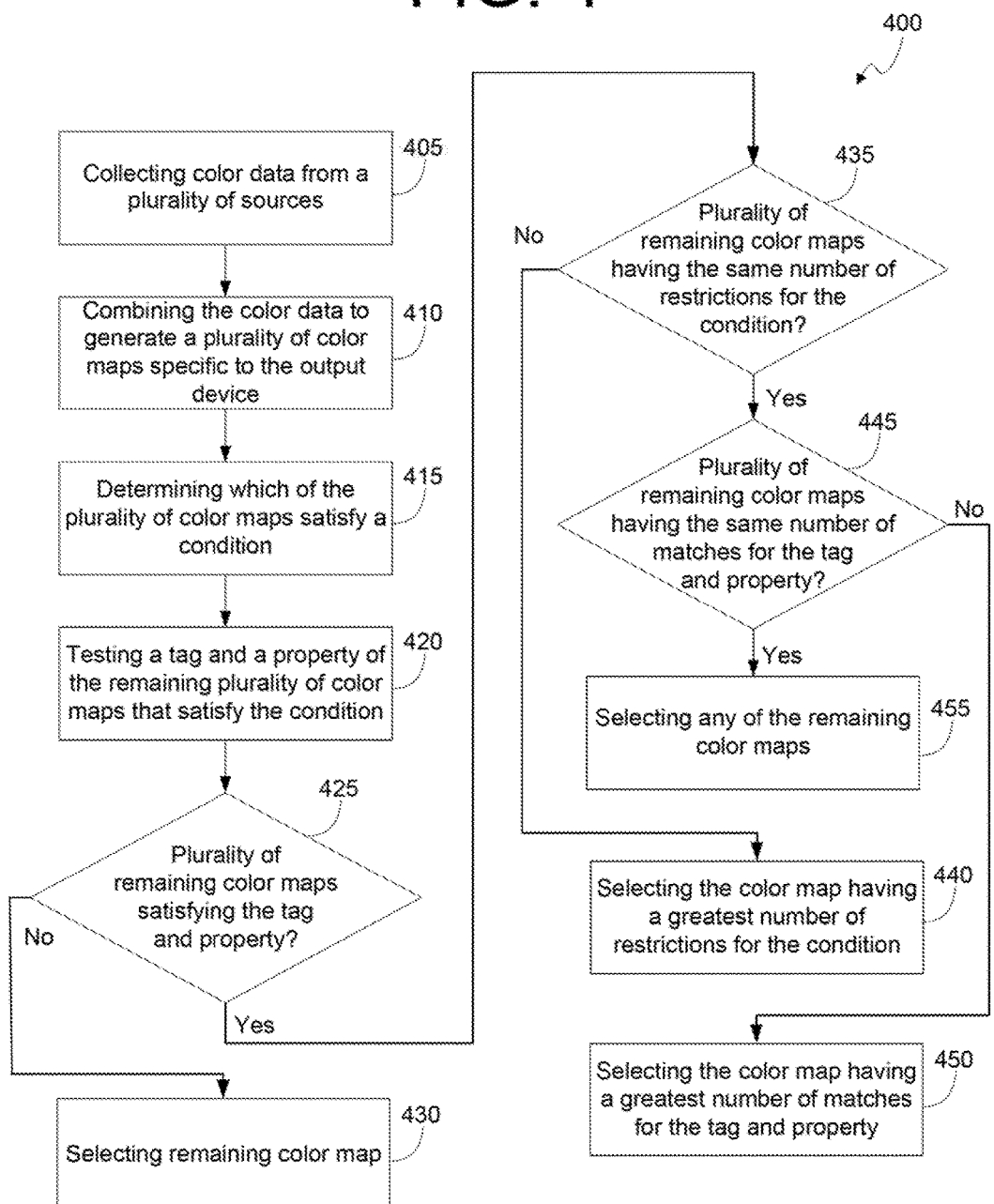
FIG. 4 is an example flowchart of a method for collecting color data from a plurality of sources for a color map.

Moreover, the instructions 322, 324 and 326 when executed by a processor (e.g., via one processing element or multiple processing elements of the processor) can cause the processor to perform processes, such as, the process of FIG. 4. For example, the collect instructions 322 may be executed by the processor 310 to collect color data from a plurality of sources. The combine instructions 324 may be executed by the processor 310 to combine the color data to at least one of generate and modify a plurality of color maps. The index instructions 326 may be executed by the processor 310 to index a plurality of color map selection fields to the plurality of color maps.

The indexed plurality of color maps may be tagged with an identifier to match permutations of at least one of a type of media, quality mode, color space and marking material usage setting of the plurality of color map selection fields. The identifier may be used to at least one of resolve and instantiate other types of data types, from a pool of the color data, based on at least one of the conditions, tags and properties. The property may describe primitive data at least one of stored and generated by the color map. The tag may identify a type of use for which the color map is compatible. The condition may restrict when the color map is available for use.

FIG. 4 is an example flowchart of a method 400 for collecting color data from a plurality of sources for a color map. Although execution of the method 400 is described below with reference to the output device 200, other suitable components for execution of the method 400 can be utilized, such as the output device 100. Additionally, the components for executing the method 400 may be spread among multiple devices. In certain scenarios, multiple devices acting in coordination can be considered a single device to perform the method 400. The method 400 may be implemented in the form of executable instructions stored on a machine-readable storage medium, such as storage medium 320, and/or in the form of electronic circuitry.

At block 405, the output device 200 is to collect color data 260 from a plurality of sources, such as a local source 230, a remote source 240 and/or a printer cartridge 250. At block 420, the output device 200 combines the color data 260 to generate a plurality of color maps 124 specific to the output device 200. Then, at block 415, the output device 200 determines which of the plurality of color maps 124 satisfies a condition 226. Next, at block 420, the output device 200 tests a tag 224 and a property 222 of the remaining plurality of color maps 124 that satisfies the condition 226.

The property 222 may describe primitive data at least one of stored and generated by the color map 124 and the tag 224 may identify a type of use for which the color map 124 is compatible. The property 222 may include at least one of a version, marking material channel, and dimension of the color map 124. The tag 224 may include at least one of a color space, media type, print quality, printer platform, and supply family.

At block 425, the output device 200 determines if there are a plurality of the remaining color maps 124 that satisfy the tag 224 and property 222. For instance, the output device 200 may first determine which of the color maps 124 meet the condition 226 (e.g. are not filtered from being used) and then determine which of these remaining color maps 124 also have at least one tag 224 or property 222 that matches one of the color map selection fields 122, while also not including any tags 224 or properties 222 that mismatch any of the color map selection fields 122.

For example, there may be mismatch if both the color map selection field 122 and the tag 224 of the color map 124 include a media tag, but for different types of media. For instance, the color map selection field 122 may specify plain media while the tag 224 may specify only glossy media. If there is not a plurality of the remaining color maps 124 (e.g. only one color map 124 remains), the method 400 flows to block 430, where the output device 200 selects the sole remaining color map 124. On the other hand, if there are a plurality of the remaining color maps 124 that satisfy the tag 224 and property 222, then the method flows to block 435.

At block 435, the output device 200 determines if there are a plurality of the remaining color maps 124 that have a same number of restrictions for the condition 226. If there is not a plurality of the remaining color maps 124 (e.g. only one color map 124 remains), the method 400 flows to block 440, where the output device 200 selects the color map 124 having a greatest number of restrictions for the condition 226. On the other hand, if there are a plurality of the remaining color maps 124 that have the same number of restrictions for the condition 226, then the method flows to block 445.

At block 445, the output device 200 determines if there are a plurality of the remaining color maps 124 that have a same number of matches for the tag 224 and property 222. If there is not a plurality of the remaining color maps 124 (e.g. only one color map 124 remains), the method 400 lows to block 450, where the output device 200 selects the color map 124 having a greatest number of matches for the tag 224 and property 222. On the other hand, if there are a plurality of the remaining color maps 124 that have the same number of matches for the tag 224 and property 222, then the method flows to block 455.

At block 455, the output device 200 selects any of the remaining color maps 124. The selected color map 124 may be indexed to a plurality of color map selection fields 122 at a locator table 220 based on the tag 224, property 222 and condition 226.

We claim:

1. An output device, comprising:
   a processor; and
   a machine-readable storage medium on which is stored instructions that when executed by the processor, cause the processor to:
   collect color data from a plurality of sources including at least one of a printer cartridge, a peripheral device, a source local to the output device and a remote source accessed over a network;
   store a locator table, the locator table to index a plurality of color map selection fields to a plurality of color maps, the plurality of color maps to be based on the collected color data, wherein each entry of the locator table includes an identifier to match one of the plurality of color maps to at least one permutation of the color map selection fields;
select one of the plurality of color maps based on a condition and the identifier; and
generate an output using the selected color map.

2. The output device of claim 1, wherein,
the plurality of color map selection fields includes at least one of a type of media, quality mode, color space and marking material usage setting,
the identifier includes at least one of a tag and a property, and
the property is to describe primitive data at least one of stored and generated by the color map, and
the tag is to identify a type of use for which the color map is compatible.

3. The output device of claim 2, wherein,
the property includes at least one of a version, marking material channel, and dimension of the color map,
the tag includes at least one of a color space, media type, print quality, printer platform, and supply family, and
the dimension includes at least of a channel and a count of nodes,
the channel relates to a type of color,
a node is to indicate output colorant amount, and
the marking material usage setting includes at least one of a normal and light setting.

4. The output device of claim 3, wherein,
at least one of the plurality of color maps is associated with the condition to restrict when the color map is available for use.

5. The output device of claim 4, wherein the instructions are further to cause the processor to:
test the condition of the plurality of color maps,
test at least one of the tag and property of the remaining plurality of color maps that satisfy the condition,
select the color map having more restrictions for the condition in response to the plurality of the color maps satisfying at least one of the tag and property,
select the color map having more matches for the tag and property in response to a plurality of the remaining color maps having a same number of restrictions for the condition, and
select any of the color maps in response to the remaining plurality of the color maps having a same number of matches for the tag and property.

6. The output device of claim 4, wherein the instructions are further to cause the processor to:
update a color map for a first color in response to a version of a color map for a second color being changed;
store the updated color map of the first color to at least one of the locator table and the printer cartridge, and
update the condition to specify that the updated color map of the first color is to be used with the changed version of the color map for the second color.

7. The output device of claim 1, wherein,
a number of the permutations of the plurality of color map selection fields is greater than a number of the plurality of color maps, and
the locator table is to map all permutations of the color map selection fields to at least one of the plurality of color maps.

8. The output device of claim 1, wherein,
the output device is a printer,
the local source is included in the printer, and
wherein the instructions are to cause the processor to collect the color data from the printer cartridge.

9. The output device of claim 8, wherein the instructions are further to cause the processor to:
generate a new color map by at least one of combining the color data from the local source and the printer cartridge and modifying the color data from the printer cartridge with the color data from the local source, and
the local source includes a parameter related to at least one of a use of chemical fixative, a heater, a dryer, a print-mode variation, a media type, a page density, humidity, temperature and duplex printing.

10. The output device of claim 8, wherein,
the printer cartridge is to include instructions to modify the locator table,
the instructions are to cause the processor to modify the locator table before the plurality of color map selection fields are indexed to the plurality of color maps, and
the locator table is to be modified to add a new color map to support an update to at least one of the property and tag included in the printer cartridge.

11. The output device of claim 1, wherein,
at least some of the color data includes a recipe, the recipe to include instructions to build the color map from at least one of an existing map and the primitive data,
the instructions to further cause the processor to execute the recipe to build the color map,
the recipe is to include an operator and an operand, and
the operator is to use the indicator to find at least one of a related color map and the primitive data as the operand to build a new color map.

12. A method, comprising:
collecting, with an output device, color data from a plurality of sources;
combining the color data to generate a plurality of color maps specific to the output device;
determining which of the plurality of color maps satisfy a condition;
testing at least one of a tag and a property of the remaining plurality of color maps that satisfy the condition, the property to describe primitive data at least one of stored and generated by the color map and the tag to identify a type of use for which the color map is compatible;
selecting the color map having a greatest number of restrictions for the condition, if a plurality of the remaining color maps satisfy at least one of the tag and the property;
selecting the color map having a greatest number of matches for the tag and property, if a plurality of the remaining the color maps have a same number of restrictions for the condition; and
selecting any of the remaining color maps, if a plurality of the remaining the color maps have a same number of matches for the tag and property.

13. The method of claim 12, wherein,
the selected color map is indexed to a plurality of color map selection fields at a locator table based on the tag, property and condition,
the property includes at least one of a version, marking material channel, and dimension of the color map, and
the tag includes at least one of a color space, media type, print quality, printer platform, and supply family.

14. A non-transitory computer-readable storage medium storing instructions that, when executed by a processor of an output device, cause the processor to:
collect color data from a plurality of sources;

combine the color data to at least one of generate and modify a plurality of color maps;

index a plurality of color map selection fields to the plurality of color maps, wherein the indexed plurality of color maps are tagged with an identifier to match permutations of at least one of a type of media, quality mode, color space and marking material usage setting of the plurality of color map selection fields;

select one of the plurality of color maps based on a condition and the identifier; and generate an output using the selected color map.

15. The non-transitory computer-readable storage medium cartridge of claim 14, wherein, the identifier is used to at least one of resolve and instantiate other types of data types, from a pool of the color data, based on at least one of the conditions, tags and properties, the property is to describe primitive data at least one of stored and generated by the color map, the tag is to identify a type of use for which the color map is compatible, and the condition to restrict when the color map is available for use.

\* \* \* \* \*

UNITED STATES PATENT AND TRADEMARK OFFICE
CERTIFICATE OF CORRECTION

| | |
|---|---|
| PATENT NO. | : 10,432,825 B2 |
| APPLICATION NO. | : 15/504048 |
| DATED | : October 1, 2019 |
| INVENTOR(S) | : Stephen J Nichols et al. |

Page 1 of 1

It is certified that error appears in the above-identified patent and that said Letters Patent is hereby corrected as shown below:

On the Title Page

Column 1, Item (72), Line 3, delete "Brush Praire" and insert -- Brush Prairie --, therefor.

In the illustrative figure, under Reference Numeral 126, Line 1, delete "Indentifer" and insert -- Identifier --.

In the Drawings

In sheet 1 of 4, FIG. 1, reference numeral 126, Line 1, delete "Indentifer" and insert -- Identifier --, therefor.

In sheet 2 of 4, FIG. 2, reference numeral 126, Line 1, delete "Indentifer" and insert -- Identifier --, therefor.

Signed and Sealed this
Seventeenth Day of March, 2020

Andrei Iancu
*Director of the United States Patent and Trademark Office*